United States Patent [19]

Koppenaal et al.

[11] Patent Number: 4,607,156

[45] Date of Patent: Aug. 19, 1986

[54] SHOCK-RESISTANT SUPPORT STRUCTURE FOR USE IN PORTABLE LASER SCANNING HEADS

[75] Inventors: Alexander L. E. Koppenaal, Voorburg; Kees R. Kooijmans, Zoetermeer, both of Netherlands

[73] Assignee: Symbol Technologies, Inc., Bohemia, N.Y.

[21] Appl. No.: 593,552

[22] Filed: Mar. 26, 1984

[51] Int. Cl.$^4$ .............................................. G06K 7/10
[52] U.S. Cl. ................................. 235/472; 174/52 R; 235/467; 372/107
[58] Field of Search ............. 235/467, 472; 174/52 R; 372/15, 107

[56] References Cited

U.S. PATENT DOCUMENTS

| | | |
|---|---|---|
| 3,425,023 | 1/1969 | Krol et al. ......................... 174/52 R |
| 4,251,798 | 2/1981 | Swartz et al. .................... 235/472 X |
| 4,451,693 | 5/1984 | Vest ................................... 174/52 R |
| 4,460,120 | 7/1984 | Shepard et al. ...................... 235/472 |

Primary Examiner—David L. Trafton
Attorney, Agent, or Firm—Kirschstein, Kirschstein, Ottinger & Israel

[57] ABSTRACT

A shock-resistant support structure for use in a laser scanning head in a laser scanning system for reading bar code symbols readily removably supportably mounts and readily positions a laser tube component for generating a laser light beam, an optical component for optically modifying and directing the laser light beam along a light path, and a scanning component for scanning the laser light beam over a field of view across a bar code symbol, on the support structure, preferably including a pair of support elements which are readily detachably connected, preferably by snap-type action, to each other to facilitate the assembly and the disassembly of the components.

25 Claims, 7 Drawing Figures

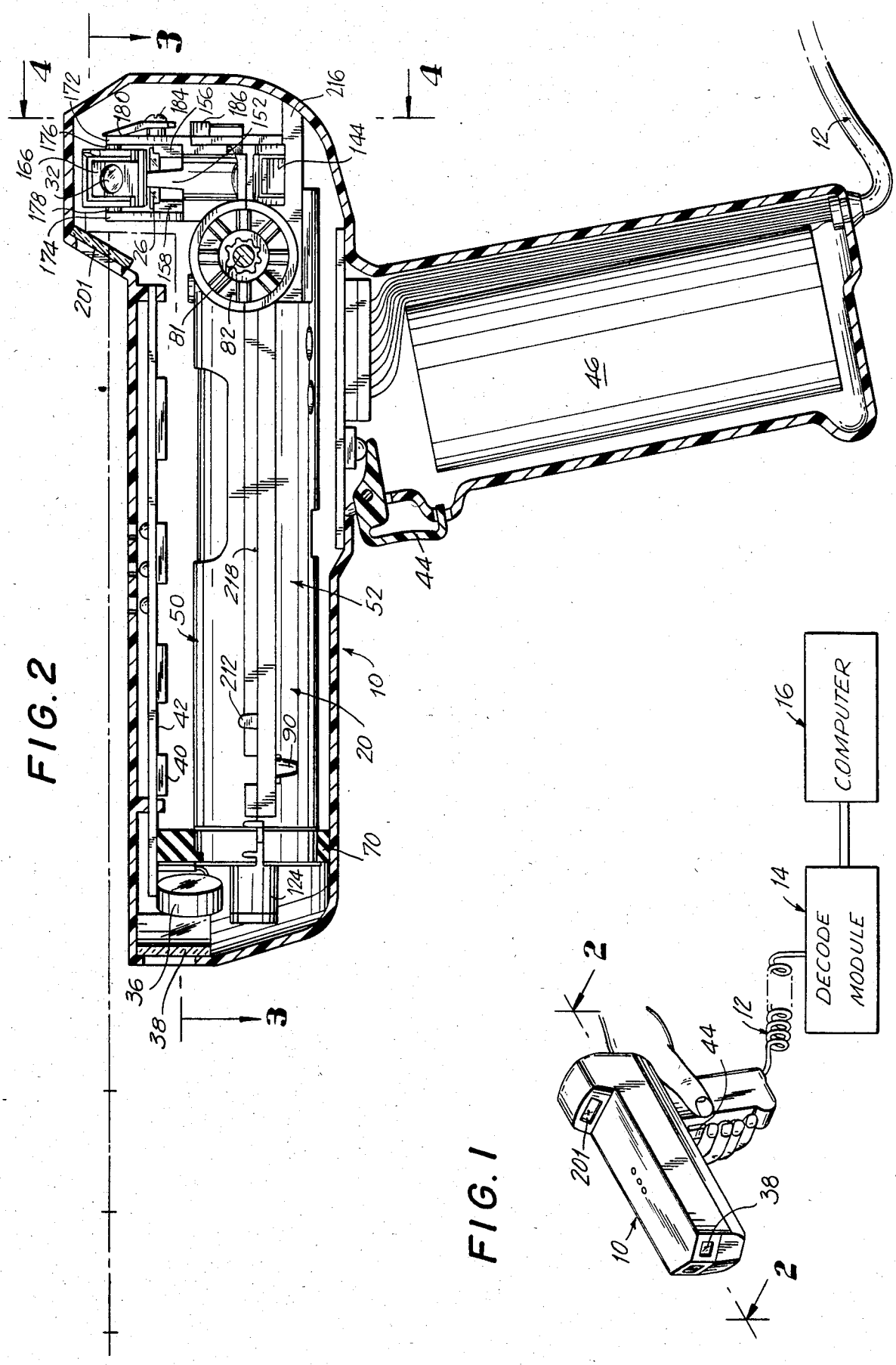

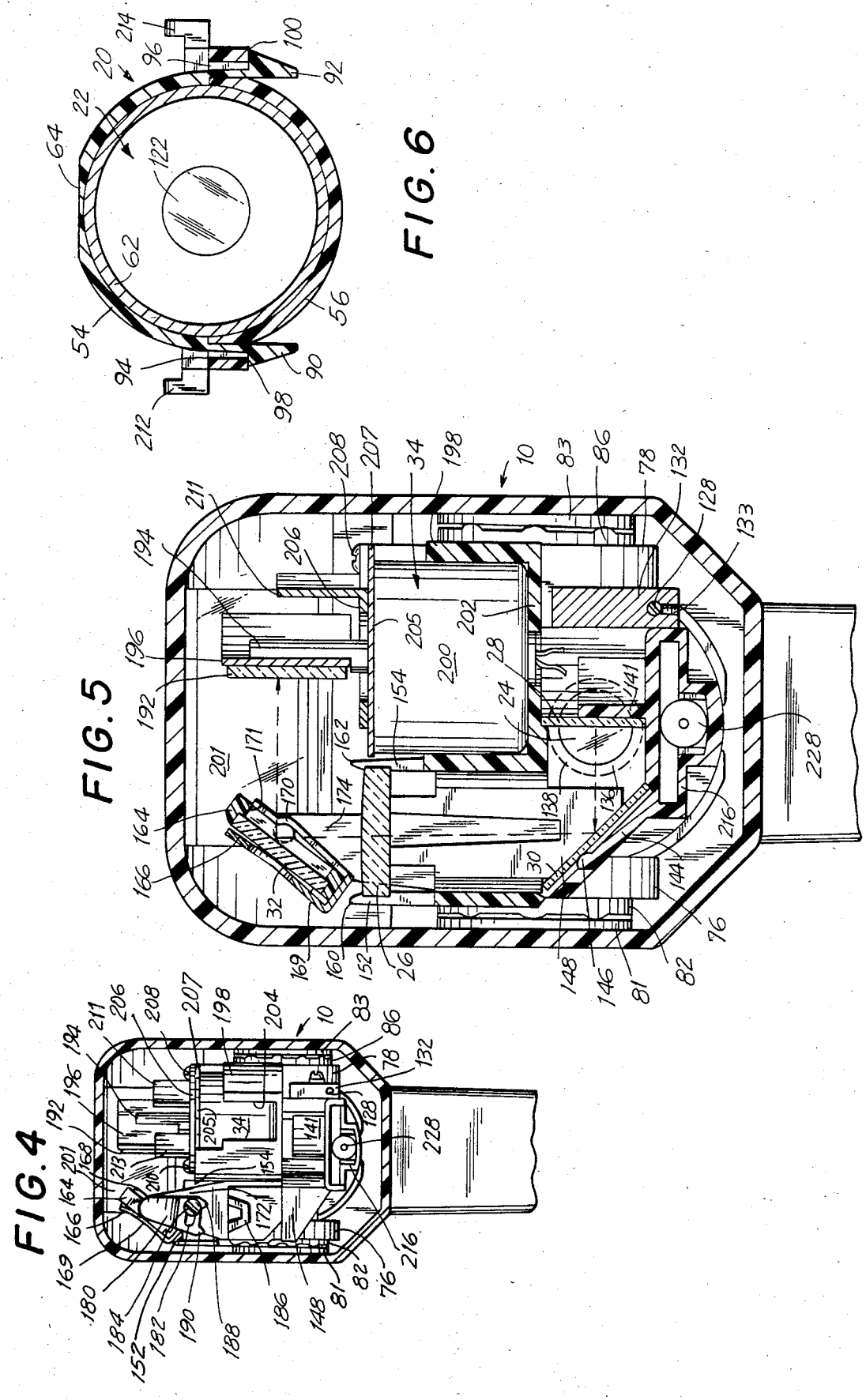

SHOCK-RESISTANT SUPPORT STRUCTURE FOR USE IN PORTABLE LASER SCANNING HEADS

BACKGROUND OF THE INVENTION

1. Field of the Invention

This invention relates generally to a shock-resistant support structure for use in a portable laser scanning head in a laser scanning system for reading bar code symbols and, more particularly, to a support structure, preferably comprised of a pair of readily detachably connected support elements, for readily removably supportably mounting thereon a laser tube component, an optical component and a scanning component, as well as for properly positioning the components after their mounting and/or for properly re-positioning the components after their removal, to facilitate component assembly and disassembly.

2. Description of the Prior Art

In the field of laser scanning systems for reading bar code symbols, it has heretofore been proposed to arrange together various components, for example, a laser tube component for generating a laser light beam, an optical component for optically modifying and directing the laser light beam along a light path, and a scanning component for scanning the laser light beam over a field of view across a bar code symbol to be read.

For example, as shown in a 1976 advertising flyer entitled "VERIFIER 315" of UPC Film Masters, Inc., a portable laser scanning head was advertised as having at least a laser tube component, an optical component and a scanning component mounted within a hand-held housing. An article entitled "NEEDED: BETTER QUALITY CONTROL FOR UPC", by Harrison and Swartz, which appeared at pp. 61-63 in the October 1976 edition of Food Engineering, also described the arrangement of the aforementioned components relative to one another. An article reprint of the VERIFIER 315 instrument also appeared at p. 50 of Packaging in 1976. The VERIFIER 315 instrument was sold in a version wherein the optical and scanning components were mounted within the laser scanning head, and wherein the laser tube component was plugged into the rear end of the head.

In another prior art proposal, U.S. Pat. No. 4,251,798 disclosed the interior mounting of the laser tube component, the optical component and the scanning component on both sides of a planar center plate or optical bench which subdivided the interior of a laser scanning head. The laser tube component was supported underneath the center plate and was essentially strapped in place therebelow.

U.S. Pat. No. 4,387,297 disclosed the mounting of the aforementioned laser tube, optical and scanning components on a support plate or motherboard within a laser scanning head wherein rubber bumpers were used to make the plate-mounted components shock resistant. Again, the laser tube component was strapped in place on the support plate.

In another prior art proposal, U.S. Pat. No. 4,409,470 disclosed the shock-resistant mounting of the laser tube component, not with the aid of straps, but by its close-fitting reception into a cylindrical support sleeve. U.S. Pat. No. 4,409,470 also disclosed the shock-resistant mounting of the optical and the scanning components on a separate optical bench or generally block-shaped support. The aforementioned support sleeve was connected to the optical bench by being snugly received in a bore formed in the bench. In practice, an adhesive was typically used to fixedly secure the support sleeve in the bore of the bench. In addition, an adhesive was also customarily used, in practice, to fixedly secure the various optical parts of the optical component to the bench. For example, a concave lens part which was positioned adjacent the output end of the laser tube component was glued inside another bore formed in the bench, and a pair of light-reflecting mirror parts was also respectively glued in place on a pair of inclined surfaces of the bench. A convex lens part was adjustably mounted on the bench by means of a set screw.

Although the above-described prior art supporting structures generally served their intended support purpose, they did not prove to be altogether satisfactory during component assembly and/or disassembly, particularly during field maintenance. Thus, it was somewhat time-consuming and inconvenient for the assembler to be compelled to assemble and/or disassemble the aforementioned components on opposite sides of a center plate, and to strap and/or unstrap the laser tube component in its proper position on the support plate. Although it was much more convenient, as taught by U.S. Pat. No. 4,409,470, to slide the laser tube component into and out of the aforementioned cylindrical support sleeve for easier assembly and replaceability, as opposed to the earlier techniques of strapping and unstrapping the laser tube component to a support plate, the glueing of the support sleeve in place in its respectively associated bore in the bench was a painstaking and a time-consuming operation. If this glueing procedure was eliminated or was poorly done during assembly, then the possibility arose, during careless or rough handling of the laser scanning head, that the support sleeve would either become detached from the bench or slightly shift relative thereto, thereby causing an optical misalignment problem.

In addition, it was painstaking and very time-consuming to glue the aforementioned pair of mirror parts in place on the inclined surfaces of the bench. In the event of any mishandling of the laser scanning head, the possibility arose that the mirror parts could either shift or perhaps even fall off the bench, thereby rendering the laser scanning head inoperative. Of course, when the glueing procedures were properly performed, then the resulting fixed connections were somewhat difficult to undo. Also, it was laborious to set the proper position of the convex lens part by adjusting the set screw. It would have been difficult and time-consuming, particularly during field replacement and maintenance, to unglue and/or remove the support sleeve and/or mirror parts and/or lenses from their essentially permanently fixed connections.

SUMMARY OF THE INVENTION

1. Objects of the Invention

Accordingly, it is the general object of the present invention to overcome the aforementioned drawbacks of the prior art support structures.

It is another object of this invention to readily detachably support the laser tube component, the optical component and the scanning component on a support structure in a portable laser scanning head in a laser scanning system for reading bar code symbols.

Another object of the present invention is to eliminate the permanent mounting of any of the aforementioned components to facilitate their assembly and/or disassembly.

It is a further object of the present invention to decrease the time and effort involved in assembling and/or disassembling any of the aforementioned components, not only during original equipment assembly but also during field replacement.

It is a still further object of the present invention to simplify the mounting of at least one, and preferably all, of the aforementioned components by positioning and/or clamping and/or capturing the respective component between a pair of support elements that are preferably readily detachably connected to each other.

It is another object of the present invention to readily position the aforementioned components at predetermined locations on a support structure by inserting the components in component-receiving recesses, and to readily insertably re-position the components at their predetermined locations after their removal from their respectively-associated recesses, to facilitate component assembly and disassembly and proper alignment of the laser light beam along the light path without laborious assembly procedures.

It is yet a further object of the present invention to quickly connect and disconnect a pair of support elements, e.g. by snap-type action.

It is another object of the present invention to provide a support structure which is light in weight, yet strong and durable in use.

It is yet another object of the present invention to fabricate a shock-resistant support structure of an injection-molded synthetic plastic material.

It is still another object of the present invention to provide a long-lasting support structure which is easy and quick to connect and/or disconnect, and on which the laser tube component, the optical component and the scanning component are easily and quickly mounted in their proper orientations and locations to cooperate as an operative assembly without requiring laborious assembly and/or disassambly procedures.

2. Brief Description of the Invention

In keeping with these objects and other which will become apparent hereinafter, one feature of the invention resides, briefly stated, in a laser scanning system for reading bar code symbols wherein a shock-resistant support structure is used in a laser scanning head of the type having a laser component, e.g. a tube or a laser diode, for generating a laser light beam, an optical component preferably consisting of a train of optical parts, e.g. a negative or concave lens, a set of substantially planar light-reflecting mirrors and a positive or convex lens, said optical component being operative for optically modifying and directing the laser light beam along a light path toward a reference plane located exteriorly of the head, and a scanning component, e.g. a light-reflecting mirror, mounted on a motor shaft that is cyclically and repetitively driven in alternate circumferential directions about the axis of the shaft, said scanning component being operative for scanning, preferably by sweeping, the laser light beam over a field of view across a bar code symbol located in the vicinity of the reference plane.

In accordance with this invention, the shock-resistant support structure comprises support means preferably including a pair of support elements for readily removably supportably mounting and positioning the laser tube component, the optical component and the scanning component thereon in an operative assembly at predetermined locations relative to one another. Upon assembly, the aforementioned components are automatically positioned at predetermined locations in an optically aligned and working relationship, except for a minor adjustment that may be necessary to compensate for tolerance variations.

The support elements are readily detachably connected to each other by connecting means, preferably by snap action. For example, at least one resiliently displaceable projection may be provided on one of the support elements, and wall portions bounding a projection-receiving recess may be provided on the other of the support elements. During insertion, the projection is displaced from an initial undisplaced state by the wall portions bounding the recess, and is returned toward its initial state due to its inherent resilience after clearing the wall portions bounding the recess, to thereby cause the support elements to snappingly engage each other. In addition, the support elements may also be readily detachably connected to each other by threaded connector means. For example, a threaded fastener, such as a thread-forming screw, may extend with clearance through a through-hole formed on one of the support elements and, after being turned, will form a thread in a juxtaposed opening provided on the other of the support elements to thereby threadedly engage the support elements to each other. Alternatively, the threaded fastener may threadedly engage a tapped bore in the other support element.

In a preferred embodiment, the snap-action coacting projection and recess are provided at one end region of the elongated support elements, and the threaded connector is provided at the opposite end region of the elongated support elements.

The readily removable support and positioning of the components on the support elements may be accomplished in a variety of ways. For example, each support element may be provided with a semi-cylindrical main portion and an adjoining semi-cylindrical bore portion which respectively receive a cylindrical body and a cylindrical output end of a laser tube component when the support elements are connected together. The laser tube component may be easily slid into and out of the interior cylindrical main cavity formed by the connected support elements. A retainer may be mounted adjacent the laser tube body and have a coil wrapped at least partially around a non-output end of the laser tube component for securing the same between the connected support elements.

At least one lens of the optical component, e.g. the concave lens, may be removably mounted in a captured manner by insertion into a recess formed between a pair of semi-cylindrical flanges formed on each support element. A planar light reflector or mirror may be removably mounted in a clamped manner by insertion into a recess or channel formed between walls provided on one of the support elements, one of the walls being a resilient tab for affirmatively urging the reflector to its predetermined location. Another planar light reflector may be removably mounted in a captured and clamped manner in a recess formed between opposite walls provided on each support element, one of the walls being a resilient tab for affirmatively urging the other reflector to its predetermined location. Still another lens, e.g. a convex lens, of the optical component may be insertably mounted on one of the support elements in a recess formed on a plurality of upright elongated arms which are arranged circumferentially about the periphery of the convex lens for supporting the same, wherein at least one of the upright arms is elastically yieldable in a transverse direction in order to fixedly secure the convex lens at its predetermined location, preferably by snap action, in an optically aligned relationship with, and at a predetermined fixed spacing from, the aforementioned concave lens. Still a further auxiliary mirror may be removably secured on one of the support elements by being insertably mounted in a recess formed by a frame and retained therein by a clip having opposite resilient walls, one of the resilient walls being operative for affirmatively urging the auxiliary reflector to its predetermined location. The angular position of the auxiliary reflector is preferably finely adjusted to compensate, if necessary, for tolerance variations. The reflector thicknesses, which are likewise prone to variations in size, are compensated by the distances through which the resilient tabs and/or walls are displaced. The scanning component which has a generally cylindrical configuration may be removably mounted in a cylindrical recess formed on one of the support elements. The scanning component may be held in place by a hold-down strap which engages a motor casing of the scanning component and which is threadedly mounted on the one support element. The motor casing may also be provided with a pair of apertured ears through which threaded fasteners extend.

To assure the proper connection of the support elements to each other, alignment projections and recesses may advantageously be provided in further accordance with this invention.

Still another feature of this invention is embodied in the retention of side bumpers in transverse cavities formed at opposite sides of each support element. These side bumpers engage opposite side walls of the laser scanning head in order to protect the components mounted on the support structure from damage. A pair of longitudinally spaced-apart raised ridges is provided on each support element, each extending, at least in part, around the periphery of the connected support elements. The raised ridges engage opposite ends of an annular front bumper and retain the same in a fixed position on the connected support elements to protect the components mounted on the support structure from damage caused by forces directed in the to-and-fro direction.

The support elements are each constituted of light-weight injection-molded synthetic plastic material. Despite the light-weight characteristic of the support structure, it is nevertheless sturdy and durable.

The readily removable support of the components on the support elements and the readily detachable connection of the support elements to each other facilitate the assembly and the disassembly of the components and the elements. This is not only of great assistance during original manufacture of the laser scanning head, but also during any subsequent maintenance, particularly in the field. The ready insertion and removal of the components into and from component-receiving recesses on the support structure, as well as the automatically proper positioning of the components after insertion, and the automatically proper re-positioning of the components after removal, are easily and quickly performed. The permanent mounting of various components as taught by the prior art, e.g. by glueing mirrors and/or lenses and/or laser tube support sleeves in place, has been eliminated by the support structure of the present invention. The time and effort involved in assembling or disassembling the various components have been greatly reduced. The assembly and the disassembly of the components no longer require complicated and laborious mounting and optical alignment procedures. The simplified assembly and disassembly procedures reduce labor costs.

The novel features which are considered as characteristic of the invention are set forth in particular in the appended claims. The improved support structure itself, however, both as to its construction and its mode of operation, together with additional features and advantages thereof, will be best understood upon perusal of the following detailed description of certain specific embodiments with reference to the accompanying drawings.

BRIEF DESCRIPTION OF THE DRAWINGS

FIG. 1 is a partially diagrammatic view of a laser scanning system for reading bar code symbols, comprising a hand-held portable laser scanning head, a decode module and a computer;

FIG. 2 is an enlarged vertical sectioned view taken along line 2—2 of FIG. 1, showing a shock-resistant support structure mounted within the laser scanning head;

FIG. 4 is a side sectioned view taken along line 4—4 of FIG. 2;

FIG. 5 is a greatly enlarged vertical sectioned view taken along line 5—5 of FIG. 3;

FIG. 6 is a vertical sectioned view taken along line 6—6 of FIG. 3; and

DETAILED DESCRIPTION OF THE PREFERRED EMBODIMENT

Figure 7:
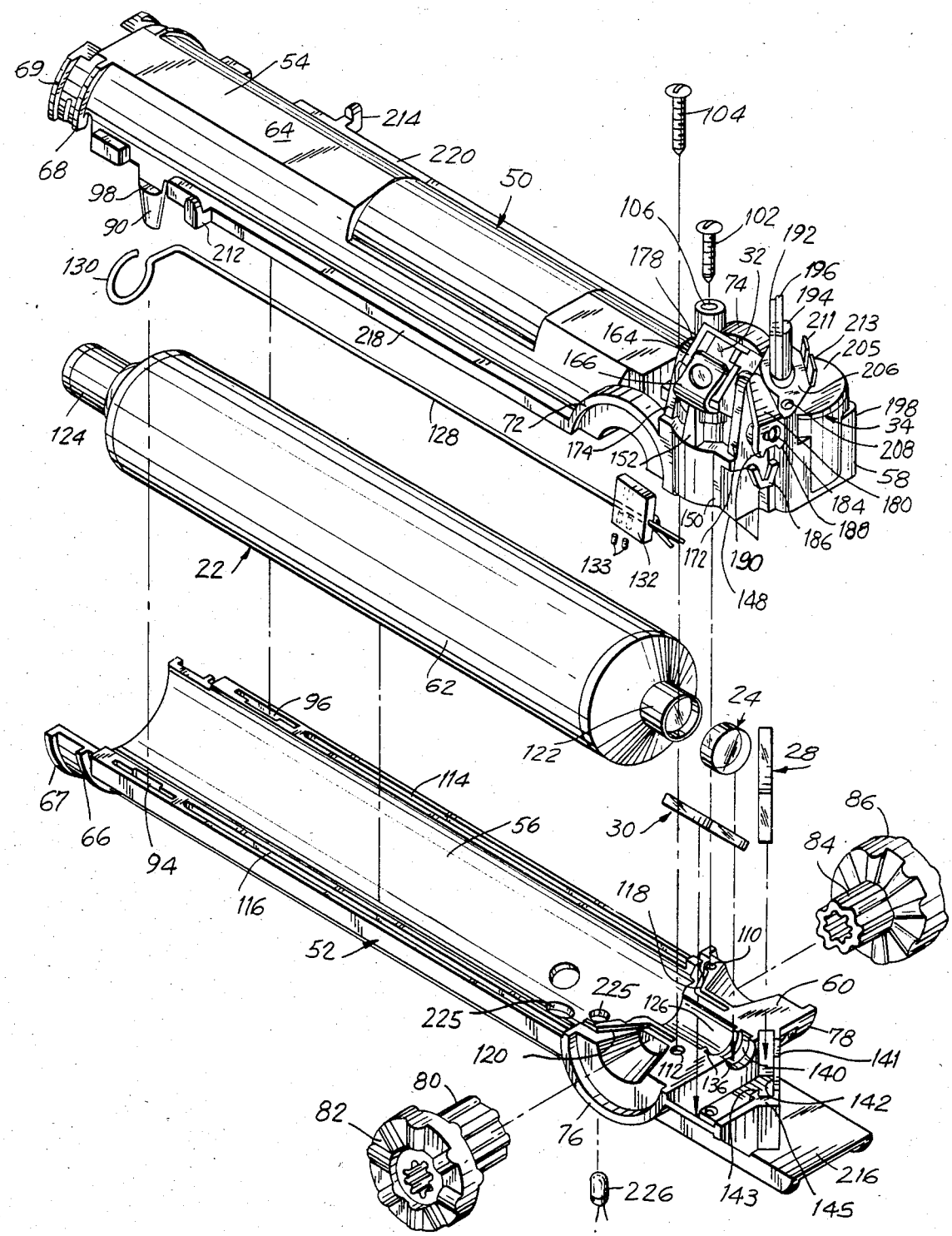
FIG. 7 is an exploded perspective view of the support structure in accordance with this invention.

Referring now to FIG. 1 of the drawings, reference numeral 10 generally identifies a portable hand-held laser scanning head for use in a laser scanning system operative for scanning, reading, evaluating and/or analyzing bar code symbols of the type comprising a series of bars and spaces of predetermined widths and arranged in a coded pattern which decodes to a multiple digit representation characteristic of a product bearing the symbol. Typical bar codes in current use are the Universal Product Code (UPC), EAN, Codabar and Code 39.

Figure 3:
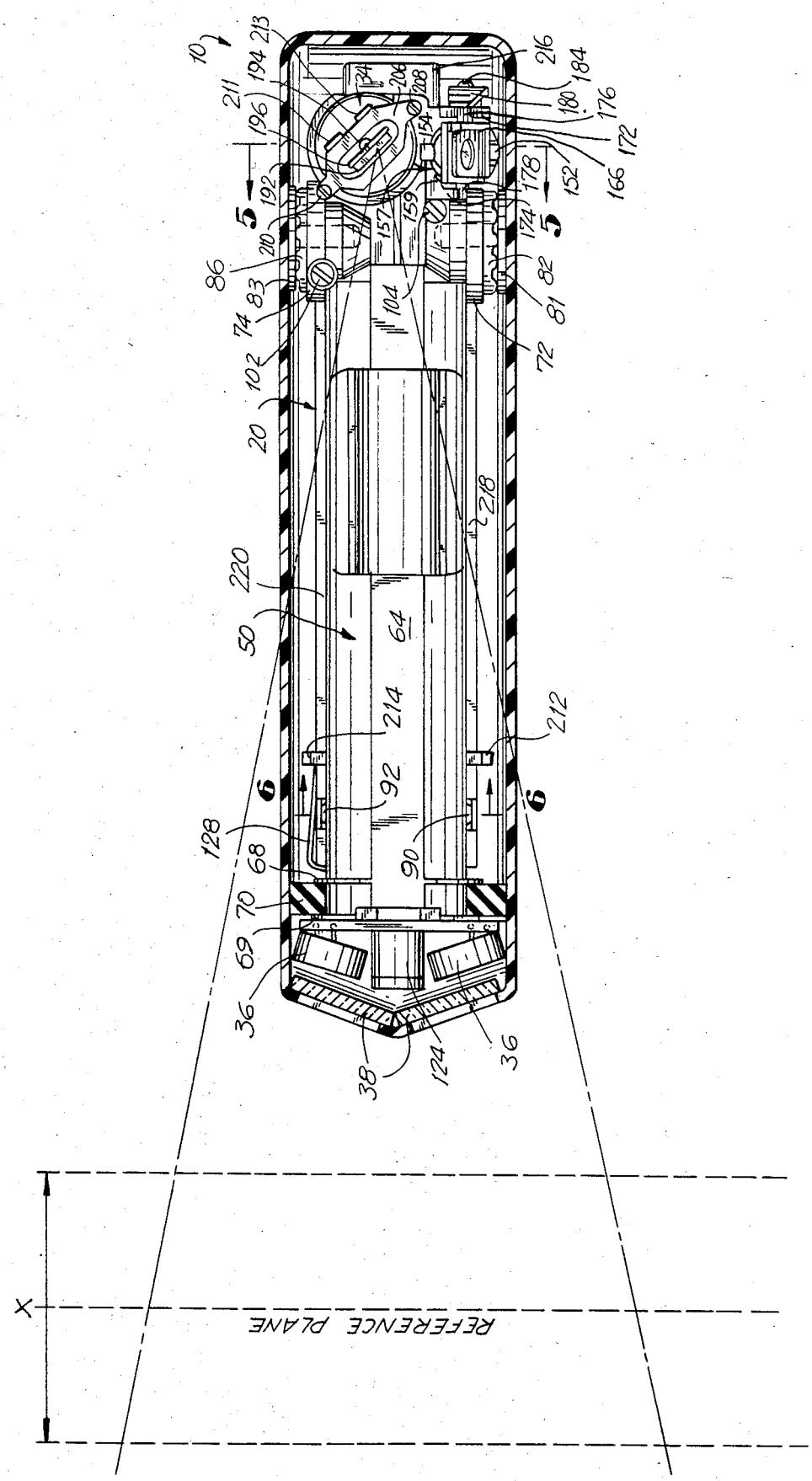
FIG. 3 is a top sectioned view taken along the line 3—3 of FIG. 2.

Mounted within the head 10 on a shock-resistant support structure 20 (see FIG. 2) are various components, e.g. a laser tube component 22 (see FIG. 7) or light source means operative for generating a laser light beam; an optical component or optic train including a negative or concave, e.g. a plano-concave, lens 24 (see FIG. 7), a positive or convex, e.g. a plano-convex, lens 26 (see FIG. 5) and a set of light-reflecting substantially planar mirrors 28, 30, 32 (see FIG. 7), said optical component being operative for optically modifying and directing the laser light beam along a light path toward a reference plane (see FIG. 3) located exteriorly of the head 10; and a scanning component 34 or high-speed scanner motor operative for scanning, preferably by sweeping, the laser light beam over a field of view across a bar code symbol located in the vicinity of the reference plane, i.e. anywhere within the depth of focus or field "X" of the laser light beam.

The structural, functional and operational features of the head 10, as well as the laser tube component, the optical component and the scanning component mounted therein, are identical to that described and illustrated in FIGS. 1-6 in U.S. Pat. No. 4,409,470, except for the support structure 20 and the manner in which the aforementioned components are mounted thereon. U.S. Pat. No. 4,409,470 is assigned to the same assignee as the present application and, for the sake of brevity, the entire contents of said patent are incorporated herein by reference and made a part of the present application.

As shown in FIG. 2, a pair of sensor elements or photodiodes 36 are located adjacent a window 38, and are operative for detecting the variable intensity of the light reflected from the symbol, and for generating an electrical analog signal indicative of the detected light intensity. Analog to digital signal processing means 40 is mounted along with other electrical circuits on a circuit board 42 for converting the analog signal to a digital signal. As shown in FIG. 1, the digital signal generated in the head 10 is conducted along a cable 12 which is connected to the remainder of the scanning system, which includes a decode module 14 for decoding the digital signal to data descriptive of the symbol, and a host computer. A trigger switch 44 for initiating the reading of the symbol, and a power supply component for supplying power to the laser tube component are also shown in FIG. 2. The structural, functional and operational features of the sensor elements 36, the signal processing means 40, the trigger 44, the power supply component 46, the cable 12, the decode module 14, the computer 16, and the other parts of the system are likewise identical to that described and illustrated in U.S. Pat. No. 4,409,470 and, again for the sake of brevity, it is not believed to be necessary to repeat that description, particularly since the entire contents of said patent have been incorporated herein by reference.

Turning now to the support structure 20 and the manner in which the laser tube, optical and scanning components are mounted thereon, which constitute the subject matter of the present invention, as best shown in the exploded view of FIG. 7, the support structure preferably includes an upper support element 50 and a lower support element 52, as considered in the preferred orientation of use. The support elements are readily detachably connected to each other, as explained below. The aforementioned components are readily removably supportably mounted relative to one another on the support elements in an operative, automatically optically aligned assembly, and are positioned at their respective predetermined locations, as also explained below.

Each support element is elongated and is preferably injection molded of a light-weight, synthetic plastic material. Elements 50, 52 respectively have main portions 54, 56 and rear extension portions 58, 60. Each main portion 54, 56 has an interior semi-cylindrical wall facing each other (see FIG. 6) which, after connection of the elements, bound an interior cylindrical main cavity in which a cylindrical body portion 62 of the laser tube component 22 may be received. The forward ends of each main portion are open to permit the laser tube component to be slid into and out of the main cavity. Main portion 56 has an exterior semi-cylindrical wall, whereas main portion 54 has an exterior wall which is semi-cylindrical over part of its periphery and which is substantially planar over a top part 64 (see FIG. 6) for increased strength and clearance above the support structure.

Main portion 56 has a pair of axially spaced-apart raised ridge portions 66, 67 which extend, at least in part, about the semi-cylindrical exterior thereof, and main portion 54 likewise has a pair of axially spaced-apart raised ridge portions 68, 69 which likewise extend circumferentially about the exterior thereof, except along the top part 64. The ridge portions 66, 68 engage one axial end of, and the ridge portions 67, 69 engage an opposite end of, an annular front rubber bumper 70 for retaining the same on the elements after the interior circular opening in the center of the bumper 70 has been pushed over the open front end of the connected elements.

Rear extension portions 58, 60 are each provided at opposite sides thereof with semi-annular transverse cavities 72, 74 and 76, 78. After connection of the elements, transverse cavity 72 and juxtaposed transverse cavity 76 bound an annular circumferentially-complete transverse side opening in which an annular fluted stem 80 of a side rubber bumper is removably received with a loose fit. Analogously, cavities 74, 78 bound an annular circumferentially-complete transverse side opening in which an annular fluted stem 84 of another side rubber bumper 86 is removably received with a loose fit. Alternatively, the stems 80, 84 may be dimensioned to be slightly larger than the cross-sectional dimension of the side annular openings so that the stems are wedged and clamped therein after connection of the elements. Each side opening is preferably composed of two sections: an interior tapered section having an outer open end of a predetermined diameter, and an exterior enlarged cylindrical section of a greater diameter. Each bumper 82, 86 is similarly configurated with a complementary configuration so as to conformingly fit into the sections of the respective side opening. A pair of journals 81, 83 integral with the opposite side walls of the barrel of the head 10 extend into interior passages formed through the stems 80, 84 to retain the bumpers in position at the sides of the support structure. The outer end faces of each side bumper have a plurality of equiangularly spaced-apart engaging portions for engaging the opposite side walls of the barrel of the head 10, to thereby, in cooperation with the front bumper 70, shock mount the components mounted on the support structure from mechanical forces.

The elements 50, 52 are readily detachably connected at their front end regions by snap action connectors. Preferably, a pair of downwardly-extending resiliently displaceable projections 90, 92 (see FIG. 6) are formed at the front end region of upper element 50. Each projection has a tapered wedge-shaped leading portion, as considered in the direction of insertion into a pair of projection-receiving recesses 94, 96 formed at the front end region of lower element 52. Each tapered leading portion is displaced inwardly from its initial undisplaced state, as shown in FIG. 7, during insertion into its respective recess by the wall portions bounding the latter, until each upwardly-diverging tapered leading portion clears the wall portions bounding the respective recess. Due to its inherent resilience, each tapered portion then springs outwardly, and a rear shoulder 98, 100 (see FIG. 6) provided at the trailing end of each tapered portion engages behind the wall portions bounding the respective recess, to thereby snappingly engage the same. To quickly disassemble the elements, the tapered portions are manually urged toward each other until their shoulders 98, 100 clear the wall portions bounding the respective recess and, thereupon, the elements can be separated.

The elements 50, 52 are readily detachably connected at their rear end regions by threaded connectors. Preferably, a pair of fasteners or thread-forming screws 102, 104 are respectively inserted with clearance into through-holes 106, 108 formed in the upper element 50, and into holes 110, 112 formed in the lower element 52 in juxtaposition with the holes 106, 108. The screws are turned to form a thread in the lower holes 110, 112, preferably without leaving shavings. Alternatively, the lower holes can be tapped, and the fasteners can be threaded directly into the tapped holes without having to form a thread. In either case, the threaded connectors serve to threadedly engage the support elements. To quickly disassemble the elements, the screws are turned and unthreaded from the holes 110, 112 and, thereupon, the elements can be separated.

It will be appreciated that snap action connectors could replace the threaded connectors, and vice versa. Also, the connectors need not be located at opposite end regions of the elements. A single detachable connector could also be used. The projections 90, 92 and the through-holes 106, 108 need not be located on the upper element 50, but could have been located on the lower element. The projection-receiving recesses 94, 96 and the holes 110, 112 need not be located on the lower element 52, but could have been located on the upper element.

A pair of linear alignment grooves 114, 116 are formed along the upper longitudinal edges of the main portion 56 of the lower element 52, and a pair of complementary linear alignment projections are similarly formed along the lower longitudinal edges of the main portion 54 of the upper element 50. In addition, a pair of stepped alignment grooves 118, 120 are formed in the upper surface of the rear extension portion of the lower element 52, and a pair of complementary stepped alignment projections are similarly formed on the lower facing surface of the rear extension portion of the upper element 50. The reception of the alignment projections into their respectively associated alignment grooves facilitates the proper alignment of the elements during their connection.

As noted previously, the laser tube component 22 has a cylindrical body portion 62 snugly received in an interior cylindrical cavity bounded by the connected support elements. The laser tube component also has an anode or cylindrical output end 122, and a cathode or cylindrical non-output end 124. Each support element has an adjoining semi-cylindrical bore portion 126 formed in its extension portion. After connection of the elements, the juxtaposed bore portions bound a cylindrical bore in which the output end 122 is lodged. A tube retainer wire 128 includes an arcuate collar portion 130 at one end region, an opposite end region which is detachably mounted in a mounting block 132 by means of a set screw 133, and an intermediate wire portion between the end regions and extending longitudinally along the laser tube. The collar portion 130 loops partially about the non-output end 124, and bears against the shoulder between the non-output end 124 and the body 62. The intermediate wire portion is taut and thus acts like a spring to urge the laser tube toward the negative lens 24. The retainer wire 128 fixedly secures the laser tube component between the elements in its proper position relative to the optical and scanning components. To remove the laser tube component, the retainer wire is detached, and the laser tube component is removed through the open end of the connected elements.

The negative lens 24 of the optical component is removably mounted on the support elements adjacent the output end 122. A pair of semi-circular axially spaced-apart flanges 136 on the rear extension 60 of the lower element 52 bound therebetween a notch 140 in which the lower portion of the lens 24 is inserted and friction tightly held along its lower semi-circular marginal edges. The rear extension 58 of the upper element 50 similarly has a pair of semi-circular flanges 138 which bound therebetween a notch in which the upper portion of the lens 24 is inserted and friction tightly held along its upper semi-circular marginal edges. After connection of the elements, the lens 24 is captured in a recess between the elements all along its periphery on both sides of the lens. The lens 24 is anchored in its proper position. To remove the lens 24, the elements are separated and the lens 24 is lifted out of its notch.

The first planar light-reflecting mirror 28, upon which the laser light beam passing through the lens 24 impinges, is removably mounted between the support elements adjacent the lens 24. A set of wall portions 141, 143, 145 on the rear extension portion 60 bounds a recess or an inclined channel 142 in which the mirror 28 is inserted and clampingly held. The rear wall portion 141 is connected only along its lower edge to the lower support element so as to be resiliently displaceable. The rear wall portion 141 is normally spaced from the front wall portion 143 at a distance less than the thickness of the mirror 28 so that, during insertion, the rear wall portion or resilient tab 141 is displaced away from the front wall portion 143. Thereupon, after insertion, the resilient tab 141 springs back due to its inherent resilience and affirmatively bears against the rear mirror surface and urges the front reflecting mirror surface to be located at its proper predetermined location, i.e. in the plane of the mirror-contacting surfaces of the front wall portion 143. No matter whether the thickness of the mirror changes due to tolerance variations, e.g. ±five mils for a mirror of ninety mils nominal thickness, the resilient tab 141 will compensate therefor and always maintain the front mirror surface at its correct location. The resilient tab 141 constantly presses the front side edges of the mirror 28 against the mirror-contacting surfaces of the front wall portion 143. After connection of the elements, the mirror, which is inclined at about a 45° angle relative to the longitudinal axis of symmetry of the support elements, is held between the elements. The inclined mirror 28 is anchored in its proper position to reflect the laser light beam transversely of said axis to the second planar light-reflecting mirror 30. To remove the mirror 28, the elements are separated and the mirror 28 is lifted out of its channel.

The second planar mirror 30, upon which the laser light beam reflected off the mirror 28 impinges, is removably mounted in a clamped manner between the support elements adjacent to the mirror 28. An inclined lower clamping wall portion or resilient tab 144 is connected only along its lower edge to the rear extension portion 60 below the rear non-reflecting surface of the mirror 30. A support bulge 146 is formed on the lower clamping portion 144 to support the mirror 30 in its proper orientation. A pair of inclined upper clamping wall portions 148, 150 is provided on the rear extension portion 58 at spaced-apart locations to contact opposite side edges on the front surface of the mirror. The front mirror-contacting surfaces of the clamping portion 144 lie in a plane. The bulge 146 on the resilient tab 144 is normally spaced from the front mirror-contacting surfaces at a distance less than the mirror thickness so that, during insertion, the tab 144 is displaced away from the front mirror-contacting surfaces, and thereafter, after insertion, the tab 144 resiliently springs back, as described before for tab 141, and positions the front mirror surface in its proper predetermined location in the same plane as the front mirror-contacting surfaces of the clamping portion 144. After connection of the elements, the mirror, which is inclined at about a 45° angle relative to the vertical, as shown in FIG. 5, is captured and clamped in the recess between the upper clamping portions 148, 150 and the lower clamping portion 144. The inclined mirror 30 is anchored in its proper position to reflect the laser light beam upwardly, as shown by dashed lines in FIG. 5, to the convex lens 26. To remove the mirror 30, the elements are separated and the mirror 30 is lifted off the lower element.

The positive lens 26 is removably mounted with snap-type action on the upper element 50. Six upright arms 152, 154, 156, 157, 158, 159 are arranged circumferentially about the periphery of lens 26, which has a circular configuration. Each arm has a ledge engaging one side of the lens 26 at six spaced-apart locations to reliably support the lens 26 in a horizontal plane. Arms 152, 154 are resilient and elastically yieldable in a direction transverse to their upright elongation. The resilient arms 152, 154 have tapered upper engaging portions 160, 162 which snappingly engage the opposite side of the lens 26 at a pair of spaced-apart locations to reliably anchor the lens in place. To assemble the lens 26, it is pressed downwardly onto the tops of the upright arms and pushed forcibly down. The tapered upper engaging portions 160, 162 are displaced outwardly until the lower face of the lens 26 rests on each ledge of the arms. Thereupon, the tapered upper upper engaging portions, due to their inherent resilience, spring toward each other and return toward their initial undisplaced state and snappingly engage behind the lens 26 at its upper face. The lens 26 is anchored in its recess formed between the arms, and is located at a fixed spacing relative to the negative lens 24. To remove the lens 26, the resilient arms 152, 154 are pushed apart sufficiently for the upper tapered engaging portions 160, 162 to clear the lens and, thereupon, the lens 26 is lifted off the arms. The lens 26 can be replaced without requiring its position relative to the lens 24 to be re-adjusted.

The third light-reflecting planar mirror 32, upon which the laser light beam exiting the lens 26 impinges, is removably mounted on the upper element 50. The mirror 32 is insertably mounted in a recess formed in a four-sided frame 164 and secured therein by a U-shaped clip 166. The clip 166 has a pair of spring fingers or resilient tabs 168, 170 having snap-in grooves which snappingly engage spaced-apart raised side edge portions on the front side of the frame 164. The clip 166 has an apertured resilient rear engaging portion 169 which engages the rear surface of the mirror 32 and presses the same against a lip 171 at the front of the frame to thereby firmly mount the mirror 32 in its predetermined location. Upon insertion of the mirror 32 into the recessed frame, the resilient rear engaging portion 169 is displaced away from the front of the frame to compensate, if necessary, for tolerance variations in mirror thickness. Hence, the front surface of the mirror 32 is fixedly clamped and anchored in its proper predetermined location in the same plane as the front mirror-contacting surfaces of the frame lip.

The frame 164 is mounted for pivoting movement on a pair of longitudinally spaced-apart upright bearings 172, 174 provided on the rear extension portion 58 of the upper support element 50. The bearings 172, 174 have journals in which a pair of stub shafts 176, 178 provided on and extending outwardly of opposite sides of the clip are respectively journaled by snap-type action. The journals are upwardly open to permit the stub shafts to be pressed downwardly therein, and to be retained therein. A frame adjustment member 180 is connected to the outer end of stub shaft 176 and extends downwardly along the upright bearing 172, but spaced a slight longitudinal distance therefrom. The adjustment member 180 has an adjustment slot 182 which is elongated in the direction of the desired adjustment, preferably along an arcuate course whose center lies on the stub shaft 176. A tightenable adjustment fastener or screw 184 has a threaded shaft extending with clearance through the slot 182 and threadedly engaging a tapped hole formed in the adjacent upright bearing 172. The screw 184 has a slotted head larger in cross-section than that of the slot for reception of a turning tool such as a screwdriver. When fully turned, the screw head bears firmly against the wall portions bounding the slot 182 and fixes the position of the tightened adjustment member and, hence, the position of the clip with the mirror 32 mounted therein relative to the upright bearing 172. To adjust the angular position of the mirror 32, the screw 184 is untightened, and the adjustment member 180 is urged in either direction along the slot 182 until the desired position is reached. Thereupon, the screw 184 is tightened by turning the screwdriver, thereby locking the mirror 32 in its proper orientation. To remove the frame from the upright bearings, the screw 184 is fully unthreaded from its associated tapped hole, and the stub shafts 176, 178 are lifted by an upwardly-directed force out of, and unsnapped from, their respective upper open-ended journals on the bearings 172, 174.

For finer adjustment of the position of the mirror 32, coacting formations 186 and 188, 190 are provided respectively on the upright bearing 172 and the adjustment member 180. The formation 186 is a generally V-shaped projection extending rearwardly of the bearing 172 adjacent to and below the generally triangular-shaped formations 188, 190 extending downwardly of the adjustment member 180 at opposite sides thereof, and terminating short of the V-shaped formation 186. The spacing of the coacting formations is such that the head of a turning tool, such as a conventional screwdriver, may conveniently fit therein. By using the V-shaped formation as a convenient support, and turning the tool head against the inner edge of the formation 188, the upper portion of the adjustment member 180 will move clockwise, as considered from the rear view of FIG. 4. Turning the tool head against the inner edge of the formation 190 will cause the upper portion of the adjustment member 180 to move counterclockwise, again as considered from the rear view of FIG. 4. To effect this fine adjustment, it is preferable if the screw 184 is initially slightly untightened. Otherwise, the turning force required to be exerted against the coacting formations would have to be greater than the tightening force exerted by the screw 184. The adjustment of the mirror 32 is to compensate for tolerance variations.

The adjustably positioned mirror 32 reflects the laser light beam, as shown by dashed lines in FIG. 5, to a substantially planar light-reflecting mirror 192 of the scanning component 34. The scanning component is a high-speed scanner motor which is identical to that described and shown in U.S. Pat. No. 4,387,297, said patent being assigned to the same assignee as the present application, and its entire contents being incorporated herein by reference and made part of this application. For purposes of this application, it is sufficient to point out that the scanning component 34 has an output shaft 194 on which a support plate 196 is fixedly mounted. The scanning mirror 192 is fixedly mounted on the support plate 196. The scanning component is driven to reciprocally and repetitively oscillate the shaft 194 and the scanning mirror 192 mounted thereon in alternate circumferential directions over arc lengths, typically of a size less than 360°, and at a rate of speed on the order of a plurality of oscillations per second, e.g. about forty oscillations per second.

The scanning component has a generally cylindrical casing 200 whose bottom end is seated against a base wall 202 formed with a central hole to provide clearance for the lower end of the shaft 194. A cylindrical side wall 198 extends upwardly from the base wall 202 and mounts the casing 200 therein. A cut-out 204 is formed in the side wall 198 to permit finger access to the casing 200 for assembly and/or disassembly purposes. The side and base walls 198, 200 bound a recess formed at the upper surface of the upper support element. The cut-out 204 also permits finger access to the casing so that the latter can be turned about a vertical axis in the requisite circumferential direction to correctly aim, if necessary, the scanned laser light beam out of a scan window 201 mounted on the head adjacent the scanning mirror 192.

The scanning component is removably mounted in the recess with the aid of a spot-welded plate 205 having apertured ears or flanges 207 extending radially outwardly on the upper end wall of the casing 200. A pair of threaded fasteners or screws 208, 210 extend through the apertures of the ears and threadedly engage tapped holes formed in the wall portions bounding the recess in which the casing is seated. The apertures may be oversized to permit a slight turning of the scanning component in either circumferential direction for aiming purposes. Upon tightening the screws sufficiently for the ears to bear firmly against the upper support element, the scanning component is removably and securely anchored in its predetermined location. This mounting approach minimizes casing distortion. A cross-member 206 is mounted across the upper end wall of the casing, not for the purpose of applying an axially-directed force to compress or otherwise distort the casing, but for positioning a pair of bent-up abutment flanges 211, 213 behind the support plate 196 to prevent the same from turning completely around, particularly during transport. The flanges 211, 213 are integral with, and extend from, the rear edge of the cross-member 206. The cross-member 206 has a central elliptical opening to fit over and clear the mirror 192, plate 196 and shaft 194 which facilitates assembly.

In another mounting approach, a hold-down strap may be mounted on to extend across the upper end wall of the casing 200 to retain the scanning component in place by a compressive force. The strap may have a central portion formed with an elliptical opening to fit over and clear the mirror 192, plate 196 and shaft 194, and a pair of integral end portions or apertured ears into the apertures of which a pair of threaded fasteners or screws, e.g. 208, 210, may extend for threadedly engaging tapped holes formed in the wall portions bounding the cylindrical recess in which the casing 200 is seated. Upon tightening the screws 208, 210 sufficiently for the strap 206 to bear firmly against the upper end of the casing 200, the scanning component is securely anchored. A bent-up abutment flange may be located behind the support plate 196 and extend upwardly from the rear edge of the hold-down strap.

To remove the scanning component, the screws 208, 210 are unthreaded and the cross-member or the strap is removed, thereby permitting the scanning component to be easily lifted out of its seat.

In accordance with this invention, the aforementioned components are readily assembled and/or disassembled on the support structure. The components are anchored in their proper orientations and distances relative to one another and do not shift even during careless or rough handling of the laser scanning head. In a preferred embodiment, the optical path between the concave and convex lenses is on the order of 38 mm, and is fixed. The reference plane is located about two inches from the front of the head, and is located a linear distance of about 9½ inches from the convex lens. The depth of field at the reference plane is about 2¾ inches on either side thereof. These numerical figures are merely exemplary, and are not intended to be self-limiting.

The stability of the support structure 20 within the head is assisted by a pair of outwardly-extending braces 212, 214 located at opposite sides of the support structure 20 adjacent the snap-type projections 90, 92. A rear shelf 216 of channel-shaped configuration extends longitudinally rearwardly of the lower support element. In the event of mishandling of the head, e.g. where the head is dropped from one's hand to the floor, one or more of the braces 212, 214 and the shelf 216 would assist the front and side bumpers in protecting the components by abutting against the interior wall of the barrel of the head. For increased structural rigidity and strength, ribs, e.g. longitudinal ribs 218, 220, are provided along the support structure. For correcting slow-starting laser tubes, an illumination port 225 is provided adjacent the laser tube. A light bulb 226 is mounted adjacent port 225 to emit its light through the same. The emitted light causes gas within the laser tube to ionize, and assists in expediting laser start-up times. A ballast resistor 228 is insertably received in a recess on the lower support element below the laser tube component.

As used throughout the specification and the claims, the term "readily" is intended to signify an easy, quick and simple-to-perform operation which, as applied to component mounting and/or element connection, does not include glueing or analogous permanent mounting and/or connection procedures.

It will be understood that each of the elements described above, or two or more together, may also find a useful application in other types of laser scanning heads, such as stand-alone, desk-top laser scanning workstations, or similar arrangements differing from the type described above.

While the invention has been illustrated and described as embodied in a shock-resistant support structure for use in laser scanning heads, it is not intended to be limited to the details shown, since various modifications and structural changes may be made without departing in any way from the spirit of the present invention. For example, rather than constituting the support structure of a pair of support elements, a single unitary element could be employed.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a laser scanning system for reading bar code symbols, a shock-resistant optical support structure for use in a laser scanning head of the type having a laser component for generating a laser light beam, an optical component for optically modifying and directing the laser light beam along a light path toward a reference plane located exteriorly of the head, and a scanning component for scanning the laser light beam over a field of view across a bar code symbol located in the vicinity of the reference plane, said support structure comprising:

(a) support means including a pair of support elements for readily removably mounting the laser component, the optical component and the scanning component at optically-precise locations relative to one another thereon in an operative optically-aligned assembly, said support elements having means for positioning and supportably maintaining the components at said optically-precise locations to facilitate rapid assembly, and for re-positioning the components at said optically-precise locations to facilitate field maintenance; and (b) connecting means for readily detachably connecting the support elements to each other, whereby the readily removable mounting of the components and the readily detachable connection of the support elements facilitate the assembly and field maintenance.

2. The support structure as defined in claim 1, wherein the connecting means includes snap action means on the support elements for engaging the latter with snap-type action upon connection of the support elements.

3. The support structure as defined in claim 2, wherein the snap action means includes at least one resiliently displaceable projection on one of the support elements, and wall portions bounding a projection-receiving recess on the other of the support elements, said one projection being displaced from an initial undisplaced state during insertion into the recess by the wall portions bounding the latter, and being returned toward its initial state due to its inherent resilience after clearing the wall portions bounding the respective recess, to thereby snappingly engage the support elements together.

4. The support structure as defined in claim 2, wherein the connecting means further includes threaded connector means on the support elements for threadedly engaging the latter.

5. The support structure as defined in claim 4, wherein the threaded connector means includes wall portions bounding at least one through-hole on one of the support elements, auxiliary wall portions bounding at least one juxtaposed bore on the other of the support elements, and at least one threaded fastener extending with clearance through said one through-hole and threadedly engaging said one juxtaposed bore, to thereby threadedly engage the support elements together.

6. The support structure as defined in claim 4, wherein the support elements are elongated, and wherein the snap action means are provided at one end region of the connected support elements, and wherein the threaded connector means are provided at the opposite end region of the connected support elements.

7. The support structure as defined in claim 1, wherein each support element has a semi-cylindrical main portion and an adjoining semi-cylindrical bore portion which lie along the same axis lengthwise of the respective support element, and wherein the connected support elements together bound an interior cylindrical main cavity and an interior cylindrical bore in which a cylindrical body and a cylindrical output end of a laser tube component are respectively received.

8. The support structure as defined in claim 7, wherein the support means includes a retainer having a collar portion located adjacent a non-output end of the laser tube component for securing the same between the connected support elements.

9. The support structure as defined in claim 7, wherein the support means further includes means for removably mounting at least one lens of the optical component on the support elements along the axis in an automatically optically aligned relationship with the output end of the laser tube component, said lens mounting means having a pair of semi-cylindrical flanges on each support element adjacent to the respective bore portion, each pair of flanges being axially spaced apart of each other to bound therebetween a notch in which said one lens is tightly seated, both pairs of flanges together engaging opposite annular marginal edges of said one lens to capture the same in its predetermined location between the connected support elements.

10. The support structure as defined in claim 9, wherein the support means further includes means for removably mounting a planar light reflector of the optical component on one of the support elements, said one support element having walls including a resiliently displaceable wall bounding a channel in which the reflector is inserted, said resiliently displaceable wall bearing against a rear surface of the reflector and affirmatively urging a front reflecting surface of the reflector to its predetermined location.

11. The support structure as defined in claim 10, wherein the support means still further includes means for removably mounting another planar light reflector of the optical component on the support elements, one support element having a stationary clamping portion for engaging a front reflecting surface of the reflector, and a resiliently displaceable clamping portion bearing against a rear surface of the other reflector and affirmatively urging the front reflecting surface of the latter to its predetermined location against the stationary clamping portion.

12. The support structure as defined in claim 9, wherein the support means still further includes means for removably mounting another lens of the optical component on one of the support elements, including a plurality of upright elongated arms arranged circumferentially about the periphery of the other lens for supporting the same, at least one of the upright arms being elastically yieldable in a direction transverse to its elongation to fixedly secure the other lens in an optically aligned and fixed relationship with the one lens.

13. The support structure as defined in claim 12, wherein said arms are spaced circumferentially around the other lens, each arm having a ledge engaging one side of the other lens, and wherein said at least one elastically yieldable arm has an engaging portion for snappingly engaging the opposite side of the other lens.

14. The support structure as defined in claim 11, wherein the support means yet further includes means for removably securing an auxiliary planar light reflector of the optical component on one of the support elements, including a frame in which the auxiliary reflector is inserted, and a clip having a front and a rear engaging portion for respectively engaging the front of the frame and the rear of the auxiliary reflector, said rear engaging portion being resiliently yieldable in a direction away from the front engaging portion during insertion of the auxiliary reflector in the frame, to thereby clamp the inserted auxiliary reflector in its predetermined location.

15. The support structure as defined in claim 14, wherein the auxiliary reflector securing means includes means for adjusting the angular position of the auxiliary reflector, said adjusting means including a frame adjusting member to which the frame is connected, said frame adjusting member having a slot elongated in the direction of the desired adjustment, and a tightenable adjustment fastener extending through the slot and operative when tightened for setting the frame adjusting member to a desired fixed position.

16. The support structure as defined in claim 15, wherein the tightenable adjustment fastener has a slotted head for reception of a turning tool; and wherein the adjusting means includes coacting formations on said one support element and said frame adjusting member, said coacting formations being spaced apart to receive a turning tool and cause the frame adjusting member to change its position upon turning of the tool for fine adjustment of the auxiliary reflector.

17. The support structure as defined in claim 1, wherein the support means includes a cylindrical recess provided on one of the support elements and in which a casing of the scanning component is seated, a pair of apertured flanges on the casing, and detachable fasteners extending through the apertured flanges and being threadedly mounted on said one support element to secure the scanning component at its predetermined location in the recess.

18. The support structure as defined in claim 1, wherein the support elements have alignment projections and recesses, said alignment projections being received in the alignment recesses for proper connection of the support elements.

19. The support structure as defined in claim 1, wherein each support element has a pair of transverse cavities at opposite sides thereof, each cavity being dimensioned to partially receive a side bumper; and wherein the cavity at one side of one support element and the cavity at the same one side of the other support element upon connection together bound a bumper-receiving opening in which the side bumper is inserted at said one side of the support elements.

20. The support structure as defined in claim 1, wherein each support element has a pair of longitudinally spaced-apart raised ridges which extend at least in part around the periphery of the connected support elements, said raised ridges engaging opposite ends of an annular front bumper and retaining the same in a fixed position on the connected support elements.

21. The support structure as defined in claim 1, wherein the support elements are each constituted of light-weight, injection-molded, synthetic plastic material.

22. In a laser scanning system for reading bar code symbols, a shock-resistant support structure for use in a laser scanning head of the type having a laser component for generating a laser light beam, an optical component for optically modifying and directing the laser light beam along a light path toward a reference plane located exteriorly of the head, and a scanning component for scanning the laser light beam over a field of view across a bar code symbol located in the vicinity of the reference plane, said support structure comprising:
support means for readily removably mounting the laser component, the optical component and the scanning component at optically-precise locations relative to one another thereon in an optically-aligned assembly, said support means including wall portions bounding a plurality of recesses in which the components are insertably received, and means for positioning the components during their insertion in, and for re-positioning the components after their removal from, their respective recesses to properly quickly position the components in an automatically optically-aligned relationship relative to one another.

23. The support structure as defined in claim 22, wherein the optical component includes a negative lens and a positive lens, and wherein the support means is operative to fixedly mount the negative and positive lens thereon at a fixed, non-adjustable, spacing relative to each other.

24. The support structure as defined in claim 22, wherein the optical component includes at least one light-reflecting mirror, and wherein the wall portions bound a recess in which the one mirror is received, and wherein the positioning means includes a resiliently displaceable wall which bears against a rear non-reflecting surface of the one mirror and which affirmatively urges and positions a front light-reflecting surface of the mirror to a predetermined location therefor.

25. The support structure as defined in claim 22, wherein the optical component includes an auxiliary light-reflecting mirror, and wherein the positioning means includes means for mounting the auxiliary mirror for adjustment for aligning the laser light beam along the correct light path to compensate for tolerance variations in the components.

* * * * *